United States Patent
Koster et al.

(10) Patent No.: US 9,037,849 B2
(45) Date of Patent: May 19, 2015

(54) SYSTEM AND METHOD FOR MANAGING NETWORK ACCESS BASED ON A HISTORY OF A CERTIFICATE

(71) Applicant: Cloudpath Networks, Inc., Wesminster, CO (US)

(72) Inventors: Kevin Lee Koster, Westminster, CO (US); Roger Lynn Haney, Denver, CO (US)

(73) Assignee: Cloudpath Networks, Inc., Westminster, CO (US)

( * ) Notice: Subject to any disclaimer, the term of this patent is extended or adjusted under 35 U.S.C. 154(b) by 52 days.

(21) Appl. No.: 13/874,063

(22) Filed: Apr. 30, 2013

(65) Prior Publication Data

US 2014/0325209 A1 Oct. 30, 2014

(51) Int. Cl.
  *H04L 9/00* (2006.01)
  *H04L 29/06* (2006.01)
  *H04L 9/32* (2006.01)

(52) U.S. Cl.
  CPC .......... *H04L 63/0823* (2013.01); *H04L 9/3268* (2013.01)

(58) Field of Classification Search
  CPC .............. H04L 9/3294; H04L 63/0823; H04L 63/0428; H04L 63/0442; G06Q 20/02
  USPC .............................. 713/155–156, 158; 726/10
  See application file for complete search history.

(56) References Cited

U.S. PATENT DOCUMENTS

| | | | |
|---|---|---|---|
| 7,814,315 B2 | 10/2010 | Parkinson | |
| 7,890,763 B1 | 2/2011 | Law et al. | |
| 8,195,934 B1 | 6/2012 | Lawrence | |
| 2004/0111607 A1 | 6/2004 | Yellepeddy | |
| 2005/0246766 A1 | 11/2005 | Kirkup et al. | |
| 2008/0172559 A1 | 7/2008 | Yellepeddy | |
| 2009/0113543 A1* | 4/2009 | Adams et al. | 726/18 |
| 2011/0185401 A1* | 7/2011 | Bak et al. | 726/5 |
| 2014/0047510 A1* | 2/2014 | Belton et al. | 726/4 |

* cited by examiner

*Primary Examiner* — Baotran N To
(74) *Attorney, Agent, or Firm* — Daniel W. Roberts; Law Offices of Daniel W. Roberts, LLC

(57) ABSTRACT

Provided is a system and method for managing network access based on a history of a Certificate. The system includes an Authentication System structured and arranged to receive from a User a request for network access, the request including a Certificate and at least one associated Characteristic distinct from the Certificate. A validation system is in communication with the Authentication System and structured and arranged to receive a request for validation of the Certificate, the Validation System evaluating the at least one Characteristic against a History for the Certificate to provide a positive or negative evaluation. The Validation System updates the History for the Certificate to include the request for validation of the Certificate. In response to a positive evaluation validating the Certificate, the Authentication System permits network access to the user. In response to a negative evaluation the Authentication System blocking network access to the user and the Certificate being restricted. An associated method of use is also provided.

46 Claims, 10 Drawing Sheets

FIG. 2

| | HISTORY | | | |
|---|---|---|---|---|
| Teah | Cert: AABB | Notes: Cert Generated 9/19/06 – Use = 30 days | | |
| 4/19/13<br>@ 8:22 AM<br>10.20.30.40<br>Sys: TR1 | 4/18/13<br>@ 7:30 AM<br>67.41.129.137<br>Sys: TR1 | 4/17/13<br>@8:15 AM<br>10.20.30.40<br>Sys: TR1 | 4/16/13<br>@ 7:00 AM<br>67.41.129.137<br>Sys: TR1 | 4/15/13<br>@8:15 AM<br>10.20.30.40<br>Sys: TR1 | 4/12/13<br>@ 7:45 AM<br>67.41.129.137<br>Sys: TR1 | 4/11/13<br>@ 8:22 AM<br>10.20.30.40<br>Sys: TR1 | ... |
| Bill | Cert: BBCC | Notes: Cert Issued 4/3/10 – Use = 45 days – Vacation 4/15/13 – 5/5/13 | | |
| 4/12/13<br>@ 8:31 AM<br>64.71.33.149<br>Sys: Any | 4/12/13<br>@ 10:11 AM<br>64.71.33.149<br>Sys: Any | 4/12/13 @<br>11:35 AM<br>64.71.33.149<br>Sys: Any | 4/12/13<br>@ 2:42 PM<br>64.71.33.149<br>Sys: Any | 4/11/13<br>@ 8:00 AM<br>10.20.30.45<br>Sys: Any | 4/10/13<br>@ 8:14 AM<br>10.20.30.45<br>Sys: Any | 4/09/13<br>@ 9:02 AM<br>10.20.30.45<br>Sys: Any | ... |
| Jim | Cert: DDEE | Notes: Cert Issued 1/2/13 – Use = 7 days (8AM-6PM M-F) | | |
| 4/5/13<br>@ 4:30 PM<br>10.20.30.13<br>Sys: Any | 4/4/13<br>@ 8:13 AM<br>10.20.30.13<br>Sys: Any | 4/3/13<br>@ 8:23 AM<br>10.20.30.13<br>Sys: Any | 4/2/13<br>@ 8:30 AM<br>10.20.30.13<br>Sys: Any | 4/1/13<br>@ 10:03 AM<br>10.20.30.13<br>Sys: Any | 3/29/13<br>@9:32 AM<br>10.20.30.15<br>Sys: Any | 3/28/13<br>@ 9:28 AM<br>10.20.30.15<br>Sys: Any | ... |
| Tom | Cert: EEFF | Notes: Cert First Used 10/4/11 – Use = 20 days (Access 4/day) | | |
| 4/21/13<br>@8:42 AM<br>10.20.30.55<br>Sys: DR2 | 4/21/13<br>@ 8:30 AM<br>10.20.30.54<br>Sys: DR2 | 4/21/13<br>@8:15 AM<br>10.20.30.53<br>Sys: DR2 | 4/21/13<br>@ 7:00 AM<br>10.20.30.52<br>Sys: DR2 | 4/14/13<br>@8:15 AM<br>10.20.30.52<br>Sys: DR2 | 4/15/13<br>@ 7:45 AM<br>10.20.30.52<br>Sys: DR2 | 4/19/13<br>@ 8:22 AM<br>10.20.30.52<br>Sys: DR2 | |

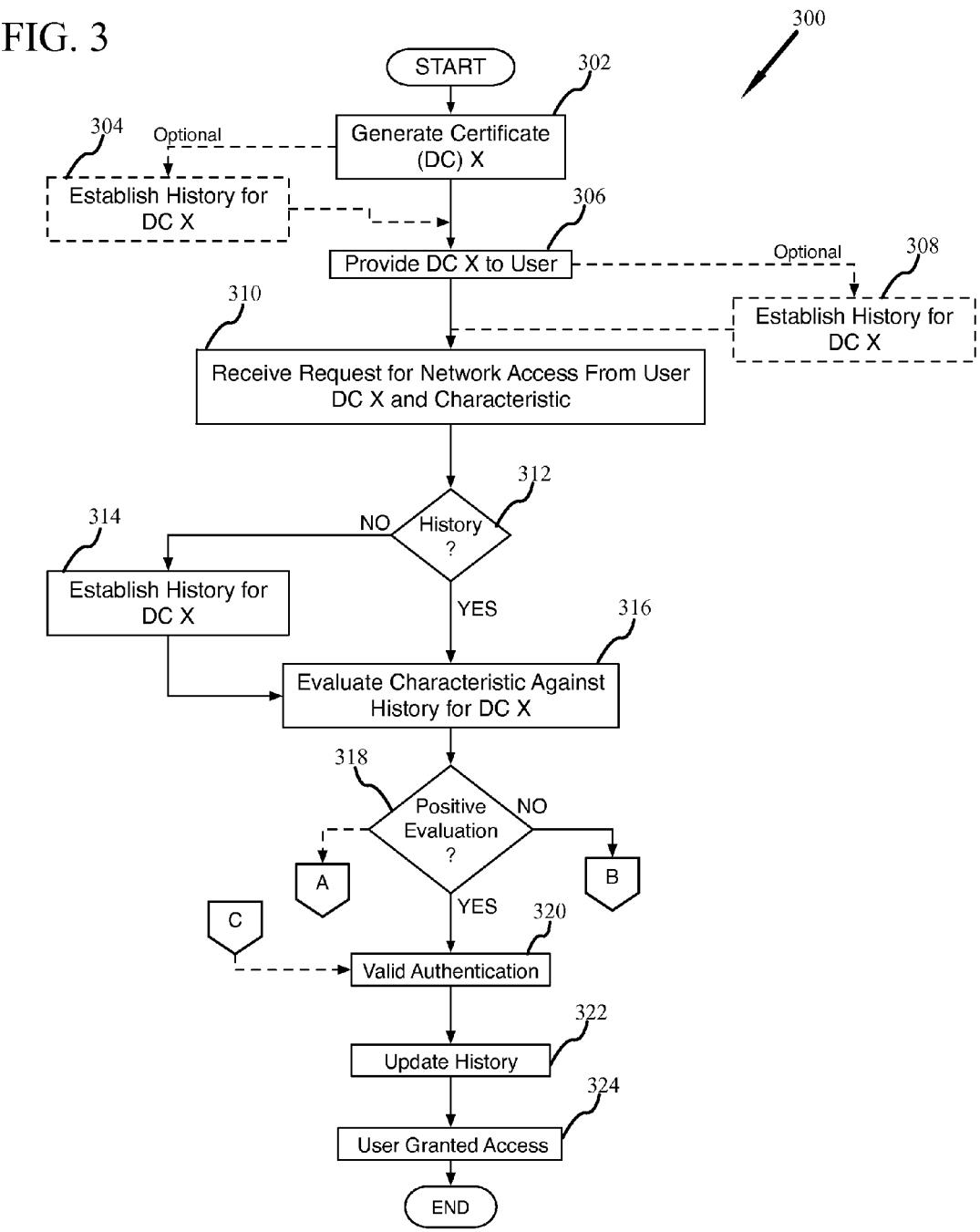

FIG. 5

| | | HISTORY | | | |
|---|---|---|---|---|---|
| Teah | Cert: AABB | Notes: Cert Generated 9/19/06 – Use = 30 days | | | |
| | 4/19/13 @ 8:22 AM 10.20.30.40 Sys: TR1 | 4/18/13 @ 7:30 AM 67.41.129.137 Sys: TR1 | 4/17/13 @ 8:15 AM 10.20.30.40 Sys: TR1 | 4/16/13 @ 7:00 AM 67.41.129.137 Sys: TR1 | 4/15/13 @ 8:15 AM 10.20.30.40 Sys: TR1 | 4/12/13 @ 7:45 AM 67.41.129.137 Sys: TR1 | ... |
| Bill | Cert: BBCC | Notes: Cert Issued 4/3/10 – Use = 45 days – Vacation 4/15/13 – 5/5/13 | | | |
| | 4/21/13 @ 1:00 PM 199.181.132.250 Sys: Any | 4/12/13 @ 8:31 AM 64.71.33.149 Sys: Any | 4/12/13 @ 10:11 AM 64.71.33.149 Sys: Any | 4/12/13 @ 2:42 PM 64.71.33.149 Sys: Any | 4/11/13 @ 8:00 AM 10.20.30.45 Sys: Any | 4/10/13 @ 8:14 AM 10.20.30.45 Sys: Any | ... |
| Jim | Cert: DDEE | Notes: Cert Issued 1/2/13 – Use = 7 days (8AM-6PM M-F) | | | |
| | 4/14/13 @ 12:20 AM REVOKED | 4/5/13 @ 4:30 PM 10.20.30.13 Sys: Any | 4/4/13 @ 8:13 AM 10.20.30.13 Sys: Any | 4/3/13 @ 8:23 AM 10.20.30.13 Sys: Any | 4/2/13 @ 8:30 AM 10.20.30.13 Sys: Any | 4/1/13 @ 10:03 AM 10.20.30.13 Sys: Any | 3/29/13 @ 9:32 AM 10.20.30.15 Sys: Any | ... |
| Tom | Cert: EEFF | Notes: Cert First Used 10/4/11 – Use = 20 days (Access 4/day) | | | |
| | 4/21/13 @ 8:52 AM 10.20.30.60 Sys: DR2 | 4/21/13 @ 8:42 AM 10.20.30.55 Sys: DR2 | 4/21/13 @ 8:30 AM 10.20.30.54 Sys: DR2 | 4/21/13 @ 8:15 AM 10.20.30.53 Sys: DR2 | 4/21/13 @ 7:00 AM 10.20.30.52 Sys: DR2 | 4/14/13 @ 8:15 AM 10.20.30.52 Sys: DR2 | 4/15/13 @ 7:45 AM 10.20.30.52 Sys: DR2 | ... |

SYSTEM AND METHOD FOR MANAGING NETWORK ACCESS BASED ON A HISTORY OF A CERTIFICATE

FIELD OF THE INVENTION

The present invention relates generally to systems and methods for establishing authentication of Users of computer networks, and more specifically to systems and methods for managing network access based on a History of a digital Certificate provided to Users of secured networks, the Certificates identifying the Users and also controlling, at least in part, the scope of network access afforded to the User, the History being used to validate or invalidate the request for access separate and apart from a Certificate revocation list.

BACKGROUND

In the physical world, individual persons are able to assess one another by sight, hearing and an accounting of physical attributes. Drivers' licenses, passports and other regulated documents provide verified accountings of attributes that permit individuals to validate who they are, or for others to validate who an individual says he or she is.

Fingerprints, retinal pattern, breath and DNA among other attributes are understood and recognized to be highly individualistic and are widely accepted and used to verify identity. But these attributes are physical and tied to a physical world.

Computers have become commonplace and highly integrated in nearly all aspects of modern life—transcending the bounds of professional and social spaces, computers are a prominent fixture in the workplace, in the home, as mobile devices and in many other places and arenas of daily life and modern existence.

Increasingly individuals are representing themselves in the cyber world of computer systems and computer networks, where digital information in the elemental form of binary data is entirely ignorant of physicality. A critical problem in cyberspace is knowing with whom you are dealing—in short, at the present time there is no precise way to determine the identity of a person in digital space. Friends, families, colleagues may use a common computer, share passwords, or even pretend to be people they are not. Sometimes these actions are benign—sometimes they are not.

As computers are often used in a commercial setting such as a business, organization or secured network (hereinafter "business"), there are often very legitimate desires by that business to know who is accessing their network. In addition, in many instances it is highly desired by a business or organization to not only know who is using their system, but also to control the type of equipment that is used with their system.

In many instances companies or other entities make use of digital certificates in an effort to gain control of who has access to what, when, and perhaps from where. In very simple terms, the digital certificate is somewhat like a key that can open the gate to secured resources.

Digital Certificates, also known as public key Certificates, are electronic documents that bind a digital signature (a mathematical schema for demonstrating authenticity) to a key, such as a public key, that is tied to an identity. A public key infrastructure (PKI) is a set of hardware, software, people, policies and/or procedures used to create, manage, distribute, use, store and revoke digital Certificates.

When referring to or working with Certificates, in many cases a PKI is implied. More simply put, digital Certificates are electronic documents that are offered to prove or verify the identity of User. Typically a Certificate is issued by a Certificate Authority (CA) that has performed or established some threshold of information to assert that the party to whom the Certificate is issued is indeed the party he or she reports to be. For a business or organization, the PKI is typically itself, or a third party entity that has been charged with providing digital Certificates to the employees.

Indeed, Certificates can and often do provide a great deal of simplicity in authenticating a User as the User has clearly established himself or herself in some way that is sufficient for a Certificate authority to provide the digital Certificate. Relying on a Certificate can ease a network's reliance on parties having previously established or contemporaneously establishing a local identity—a savings both in terms of time for the User and costs associated with the overhead and storage of the User identity for the local network.

Validation of the Certificate is traditionally accomplished by checking the Certificates against a Certificate Revocation List ("CRL") provided by the issuing Certificate Authority. The Certificate Revocation List is typically a very long and batch provided document—which is to say that it is not generally updated in real time and contemporaneously available to Users. Those wishing to check the validity of Certificates must obtain the CRL at regular intervals and then review that entire list—if the serial number of a Certificate is not listed, then it is presumed valid. If the Certificates serial number is listed, then the Certificate has been revoked.

This batch processing is both time consuming and in some cases does not provide the speed, flexibility, tuneability, and/or adaptability of control that may truly be desired. Indeed changes may have occurred—such as termination, theft of equipment, or even simple vacation of the User—which might very well affect the conditional state of his or her Certificate, but which might not yet be reflected in the CRL.

In addition, in some cases revocation of a Certificate may be initiated and followed shortly thereafter by the re-issuing of a new Certificate to the same User. This back and forth with the Certificate Authority, removal of old Digital Certificates and installation of new Certificates at times being a frustrating and time consuming task that detracts from time that might otherwise be spent more productively on business matters.

Hence there is a need for a method and system that is capable of overcoming one or more of the above identified challenges.

SUMMARY OF THE INVENTION

Our invention solves the problems of the prior art by providing novel systems and methods for providing network access management based on a History of a Certificate.

In particular, and by way of example only, according to one embodiment of the present invention, provided is a method of managing network access based on a history of a Certificate including: receiving a request for network access from a user, the request providing a Certificate and having at least one associated Characteristic distinct from the Certificate; evaluating the at least one Characteristic against a history for the Certificate to provide a positive or negative evaluation; in response to a positive evaluation validating the Certificate and permitting network access to the user; in response to a negative evaluation restricting the Certificate and blocking network access to the user; and updating the history for the Certificate to include the request.

For another embodiment, provided is a system for managing network access based on a history of a Certificate including: an authentication system structured and arranged to receive from a User a request for network access, the request including a Certificate and at least one associated Characteristic distinct from the Certificate; and a validation system in communication with the authentication system and structured and arranged to receive a request for validation of the Certificate, the validation system evaluating the at least one Characteristic against a history for the Certificate to provide a positive or negative evaluation, the validation system further updating the history for the Certificate to include the request for validation of the Certificate; wherein in response to a positive evaluation validating the Certificate, the authentication system permitting network access to the user and in response to a negative evaluation the authentication system blocking network access to the user and the Certificate being restricted.

Further, in yet another embodiment provided is a non-transitory machine readable medium on which is stored a computer program for managing network access based on a history of a Certificate, the computer program comprising instructions which when executed by a computer system having at least one processor performs the steps of: receiving a request to validate a Certificate, the request including the Certificate and having at least one associated Characteristic distinct from the Certificate; evaluating the at least one Characteristic against a history for the Certificate to provide a positive or negative evaluation; in response to a positive evaluation validating the Certificate to permit network access to a user; in response to a negative evaluation restricting the Certificate and blocking network access to a user; and updating the history for the Certificate to include the request.

Still, in yet another embodiment, provided is a non-transitory machine readable medium on which is stored a computer program comprising instructions to adapt a computer system having at least one processor to provide network access based on a history of a Certificate including: an input routine operatively associated with an input device for receiving a request for network access from a user, the request providing a Certificate and having at least one associated Characteristic distinct from the Certificate; an evaluating routine for evaluating the at least one Characteristic against a history for the Certificate to provide a positive or negative evaluation; in response to a positive evaluation validating the Certificate and permitting network access to the user; in response to a negative evaluation restricting the Certificate and blocking network access to the user; and updating the history for the Certificate to include the request; and an output routine for returning at least validation or restriction of the Certificate as determined by the evaluation routine.

BRIEF DESCRIPTION OF THE DRAWINGS AND SUPPORTING MATERIALS

FIG. 2 illustrates a portion of history, and specifically a history of use for certificates in accordance with at least one embodiment;

FIG. 3 illustrates a flow diagram for a method of managing network access based on a history of a certificate in accordance with at least one embodiment;

FIG. 5 illustrates a portion of history shown in FIG. 1 updated to reflect the most recent requests for access in accordance with at least one embodiment;

DETAILED DESCRIPTION

Figure 1:
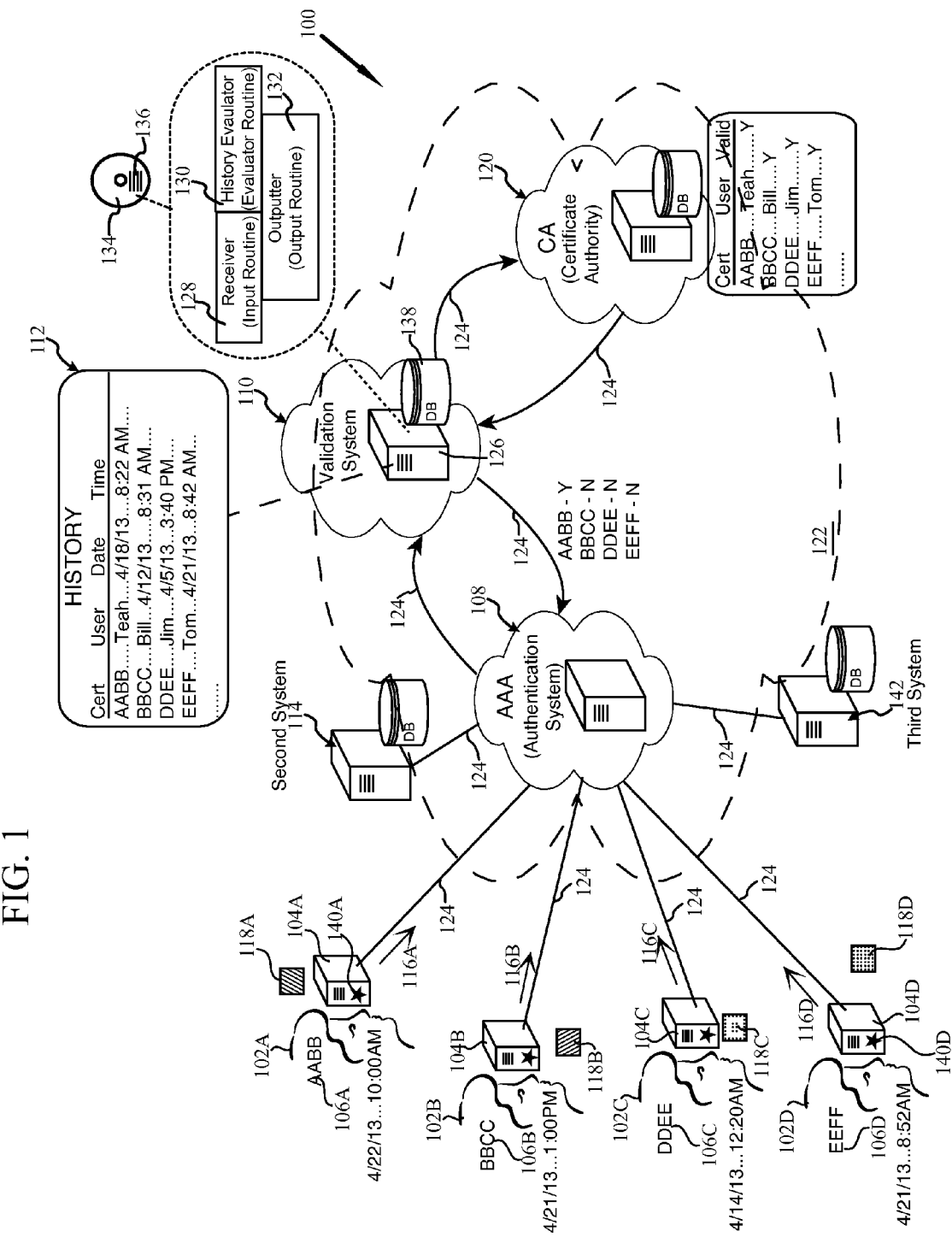
FIG. 1 illustrates a high level diagram of a system for managing network access based on a history of a certificate in accordance with at least one embodiment.

Before proceeding with the detailed description, it is to be appreciated that the present teaching is by way of example only, not by limitation. The concepts herein are not limited to use or application with a specific system or method for providing a Certificate, and more specifically a Certificate for network access. Thus although the instrumentalities described herein are for the convenience of explanation shown and described with respect to exemplary embodiments, it will be understood and appreciated that the principles herein may be applied equally in other types of systems and methods involving managing network access with the use of a Certificate.

This invention is described with respect to preferred embodiments in the following description with reference to the Figures, in which like numbers represent the same or similar elements. Further, with the respect to the numbering of the same or similar elements, it will be appreciated that the leading values identify the Figure in which the element is first identified and described, e.g., element 100 appears in FIG. 1.

In addition, some portions of the detailed descriptions that follow are presented in terms of the manipulation and processing of data bits within a computer memory. The steps involved with such manipulation are those requiring the manipulations of physical quantities. Generally, though not necessarily, these quantities take the form of electrical or magnetic signals capable of being stored, transferred, combined, compared and otherwise manipulated. Those skilled in the art will appreciate these signals are commonly referred to as bits, values, elements, numbers or other identifiable elements.

It is of course understood and appreciated that all of these terms and similar terms are associated with appropriate physical quantities and are merely convenient labels applied to these physical quantifies. Moreover, it is appreciated that throughout the following description, the use of terms such as "processing" or "evaluating" or "receiving" or "outputting" or the like, refer to the action and processor of a computer system or similar electronic computing device that manipulates and transforms data represented as physical (electrical) quantities within the computer system's memories into other data similarly represented as physical quantities within the computer system's memories.

The present invention also relates to apparatus for performing the operations herein described. This apparatus may be specifically constructed for the required purposes as are further described below, or the apparatus may be a general purpose computer selectively adapted or reconfigured by one or more computer programs stored in the computer upon computer readable storage medium suitable for storing electronic instructions.

To further assist in the following description, the following defined terms are provided.

"Certificate Authority"—the entity that issues digital Certificates. Commercial Certificate Authorities often use a combination of techniques including government and private information bureaus, credit card based payment infrastructure, and other measures in an effort to verify and assure that public key contained in the Certificate belongs to the person, organization, server or other entity noted in the Certificate. Moreover, Certificate Authorities not only issue Certificates, but are also used to verify the validity of the holder of the Certificate. Revocation of Certificates is handled by a Certificate Registration List ("CRL") that provides serial numbers of revoked Certificates. Typically, CRL's are provided at defined intervals.

"Authentication System"—The system to which Users connect when requesting access to a secured system or resource, such as an active directory based on the determined validity of a presented Certificate. For at least one embodiment the Authentication System is an Authentication, Authorization and Accounting ("AAA") system such as a RADIUS server.

"Second System"—the network or application resource to which a User may connect or engage based on the User having an appropriate Certificate.

"Validation System"—the entity that evaluates at least one Characteristic with respect to a History for a provided Certificate to determine the validation status of the Certificate. As is set forth below, it is an aspect of the present invention to validate or invalidate a Certificate based a History associated with the Certificate, and more specifically a History of use, generally in near real time and without the use of a CRL.

"First Device"—the computing device that is used by the person requesting a Certificate. As is further set forth below, it is an aspect of the present invention to validate the device as proper in determining whether or not to provide the requesting person with a Certificate.

"Device Trait"—a physical aspect of the device and/or a software aspect of the device which is an identifiable element of the device, such as, but not limited to, device ID number, device serial number, device type, manufacturer, software version, software ID, an application, digital ID, MAC address, or other similar element. It may also be the presence of or perhaps the absence of a discrete file, and/or the response to a private key or public key challenge. Typically it is provided as a component of the request for the Certificate, directly or as perhaps metadata, but it also may be determined by querying the requesting device.

"Device Criteria"—at least one predetermined Device Characteristic, which if correlated with a requesting device is at least a partial basis for granting a requested Certificate.

"User"—typically a person or at the very least a device used by a person who is known to the First System in the sense that the he or she has established a User account with the First System by providing a threshold of data, e.g. attributes, to identify themselves. Typically it is expected that the Users interactions with the First System will also serve to establish additional Attributes about themselves. For at least one embodiment, the Users have pages or accounts that may be viewed by other Users and or applications.

"Certificate"—also referred to as a digital Certificate, this is a credential that is usable for authentication to the Second System. In at least one embodiment, the Certificate is an X.509 digital Certificate.

"Certificate Trait"—elements of data that are encoded into or associated with the Certificate. Certificate Trait may include but are not limited to, a root Certificate authority, intermediate Certificate authority, time period, common name, subject name, subject's alternative name.

"Characteristic"—an element of data that is distinct from the Certificate and/or Certificate Trait, such as but not strictly limited to the time, date, IP address, or system hardware address, that may be readily determined from the request for network access made by a User in connection with the presentation of the Users Certificate. Moreover, the Characteristic may be an element that is provided directly by the User and is a part of the submitted request, i.e., the User's IP or MAC address, or it may be an element that is determined by the Authentication System and/or the Validation System, i.e., the time the User's request is received.

To briefly summarize, provided is a system and method for managing network access based on a History of a Certificate. In general a User is provided with a Certificate that he or she will use for access to secured network access to one or more systems and resources. When a User holding such a Certificate makes a request for network access, the Authentication System receives the request and at least one associated Characteristic, such as the time of the request. Rather than the general approach of determining validity based on a CRL, the associated Characteristic is evaluated by a Validation System against a History for the Certificate. In at least one instance this is a History of use for the Certificate.

If in comparing the Characteristic to the History of use it is determined that the User is making his or her request within a regular use window—i.e., every thirty days, and/or within an approved time window—i.e., between 8:00 AM and 6:00 PM, and/or the request is made with an approved system, then the Certificate is evaluated to be positive. Certainly other criteria for History of use may be specified as well. If the evaluation is negative then the Certificate is restricted. In at least one embodiment the User is provided with an opportunity to re-authenticate him or herself before the Certificate is truly revoked.

This summary may be more fully appreciated with the respect to the following description and accompanying figures.

Turning now to the figures, and more specifically, FIG. 1, there is shown a high level diagram of an embodiment of a system for managing access based on a History of a Certificate, e.g., HDC 100, for network access to Users 102 having a first device 104, and a Certificate 106.

HDC 100 also includes at least an Authentication System 108, a Validation System 110 having a History 112, and a Second System 114 to which the Users 102 desire access. As set forth below, in varying embodiments each of these systems may be a separate system within HDC 100, or one or more of these system may be combined with one another.

With respect to each device or system, whether the Users 102 First Device 104, the Authentication System 108, the Validation System 110, the Second System 114, or other device or system as discussed below, each is understood and appreciated to be a computing device including one or more microprocessors, memory, input and output devices, and the like which are adapted by hardware and/or software to permit data exchange over a network, and more specifically browser based data exchange.

Returning to FIG. 1, as shown HDC 100 includes an Authentication System 108 that receives the request 116 for access from the User 102, the request 116 including the Certificate 106. There is also at least one Characteristic 118 distinct from the Certificate 106, such as, but not limited to, the date, the time, the IP address, the Mac Address, the geographic location of the User, or some other element that may be used and evaluated against the History of the Certificate to determine validity of the Certificate and thus permit the requested access.

Also shown in FIG. 1 is a Second System 114 to which the network access is granted. As suggested by the illustration of FIG. 1, the Authentication System 108 and the Second System 114 may indeed be separate systems. However, it should also be appreciated that the Authentication System 108 and the Second System 114 may both be varying parts of a greater whole—such as a company, business, or other entity that provides the Authentication System 108 as a way to authenticate it's Users 102, and the Second System 114 is the private network to which the authenticated Users 102 are then given network access.

As used herein, the term "network access" is understood and appreciated to be the ability of a User 102 to make use of the resources of Second System 114. This may include for example, but is not limited to, the use of applications, access to data, and connectivity to other systems and Users 102 within the Second System 114 as well as other public and private systems.

Certificates 106 are provided by one or more Certificate Authority, of which Certificate Authority 120 is exemplary. As shown, Certificate Authority 120 has a database that includes serial numbers for Certificates 106A, 106B, 106C and 106D assigned respectively to exemplary Users 102A, 102B and 102C. As all of these Certificates are shown to be valid, none of these Certificate serial numbers will exist in a CRL provided by Certificate Authority 120.

There is also a Validation System 110 that is in communication with the Authentication System 108. The Validation System 110 is structured and arranged to receive a request for validation of the Certificate 106 when a User requests access and provides his or her Certificate 106. For at least one embodiment the Validation System 110 also receives the Characteristic 118 as an element of the request for validation of the Certificate 106. For at least one alternative embodiment, the Validation System 110 may generate the Characteristic 118, such as to determine the date and time of the request for validation.

In varying embodiments, one or more of the elements of HDC 100 may be directly connected to one another, if not integrated with each other, but it is understood and appreciated that in most instances the incorporation of the Internet 122 as a common means of communication and information exchange is within the scope of the present invention.

In at least one embodiment, the Validation System 110, the Authentication System 108, and the Certificate Authority 120 are distinct systems, each understood to be a computing device including microprocessors, memory and the like which are adapted by hardware or software to permit data exchange over a network, and more specifically browser based data exchange. For at least one alternative embodiment, the Validation System 110 is an incorporated part or component of the Authentication System 108. For yet another alternative embodiment, the Validation System 110 is an incorporated part or component of the Certificate Authority 120.

It is also to be understood and appreciated that the elements of the HDC 100 need not maintain continual communication links 124. In other words, Users 102 may log on or off, and thus establish a link to Authentication System 108 and subsequently Second System 114, the Second System 114 may be on or off line at different times for different reasons, the Authentication System 108 may be on or off line at different times and for different reasons, and even the Validation System 110 and/or the Certificate Authority 120 may be on or off line at different times and for different reasons. However, in general it is understood and appreciated that for expected operation either the elements as shown or suitable substitutions are understood and appreciated to be available for expected operation of HDC 100.

As is conceptually illustrated, the Validation System 110 has a History 112 for the Certificates 106. More specifically, for at least one embodiment, the History 112 is a History of use for each Certificate 106. This History 112 may optionally include the date the Certificate 106 was generated, and/or the date the Certificate 106 was provided to the User 102, and moreover is understood to be populated with historical information relating to the Certificate 106 even before a User makes his or her first request for access. In at least one alternative embodiment, the History 112 may be established for a particular Certificate 106 upon the first instance of use of the Certificate.

As noted above, the Validation System 110 is provided by at least one computer system 126 (including at least one microprocessor, memory, I/O device, and the like) adapted at least in part to provide the Validation System 110. To facilitate this adaptation, in at least one embodiment the Validation System 110 has a receiver 128, a History evaluator 130, and an outputter 132.

The receiver 128 is structured and arranged to receive the request for validation of the Certificate 106 from the Authentication System 108. The receiver 128 is also structured and arranged to receive the Characteristic 118 as an element of the request. As noted above, the Characteristic 118 may be provided to the receiver 128 by the Authentication System 108, or receiver 128 may self determine the Characteristic 118, such as retrieving the current time and date associated with the validation request.

In varying embodiments, the receiver 128 may optionally also be structured and arranged to receive browser connection data such as a browser agent string which identifies the type of web browser being used which may in turn indicate the type of First Device 104 being used, i.e. a Device Trait 140. The receiver 128 may of course receive the Device Trait 140 through other methods as well.

The History evaluator 130 is structured and arranged to evaluate the at least one Characteristic 118 against the History 112 associated with the Certificate 106. The outputter 132 is structured and arranged to return to the Authentication System 108 a positive or negative evaluation of the Certificate 106 based on the comparison of the Characteristic 118. More specifically, the outputter 132 provides the evaluation to the Authentication System as to the Certificate 106 being valid or restricted based on the Characteristic 118.

With respect to HDC 100, it is understood and appreciated that in varying embodiments the elements, e.g., the receiver 128, the History evaluator 130 and the outputter 132 may be provided as software routines, hardware elements and/or combinations thereof. In addition, the receiver 128, the History evaluator 130 and the outputter 132 have also been illustrated distinctly for ease of illustration and discussion. In varying embodiments of course it is understood and appreciated that one or more of these elements may be combined and/or further subdivided into a number of sub-elements.

With respect to FIG. 1, the elements of the receiver 128, the History evaluator 130 and the outputter 132 are conceptually illustrated in the context of an embodiment for a computer program. Such a computer program can be provided upon a non-transitory computer readable media, such as optical disc 134, having encoded thereto an executable instructions 136 for an embodiment of a program for managing network access based on a History 112 of a Certificate 106.

The computer executable instructions 136 are provided to computer system 126. During operation, the program for managing network access based on a History 112 of a Certificate 106 may be maintained in active memory for enhanced speed and efficiency. In addition, the program for managing network access based on a History 112 of a Certificate 106 may also be operated within a computer network and may utilize distributed resources.

In addition, for at least one embodiment, the Validation System 110 is provided with a database 138 for maintaining the History 112. In varying embodiments, the database 138 may be a component integrated with the Validation System 110, or a remote database to which the Validation System 110 has access rights when and as needed. Moreover, the database 138 provides correlated records regarding the Users 102 known to HDC 100, their Certificates 106, and most specifically the History 112 associated with each Certificate 106.

Moreover, for at least one embodiment, HDC 100 may be summarized as a system for managing network access based on a History of a digital Certificate. HDC 100 includes an Authentication System 108 structured and arranged to receive from a User 102 a request 116 for network access, the request 116 including a Certificate 106 and at least one associated Characteristic 118 distinct from the Certificate 106. HDC further includes a Validation System 110 in communication with the Authentication System 108 and structured and arranged to receive a request 116 for validation of the Certificate 106, the Validation System 110 evaluating the at least one Characteristic 118 against a History 112 for the Certificate 106 to provide a positive or negative evaluation, the validation system further updating the History 112 for the Certificate 106 to include the request 116 for validation of the Certificate 106. In response to a positive evaluation validating the Certificate 106, the Authentication System 108 permitting network access to the User 102 and in response to a negative evaluation the Authentication System 108 blocking network access to the User 102 and the Certificate 106 being restricted.

For the example as shown, the portion of the History 112 as illustrated shows the last time each of the Users 106A, 106B, 106C and 106D requested access. This minor selection is for ease of illustration and discussion only, for in varying embodiments, the History 112 may be configured to record each and every request for access, the origin IP address from which the request is made, the duration of access use, and or various other factors that may be desired in various embodiments.

FIG. 2 provides a more detailed conceptual view of History 112, and more specifically exemplary histories 112A, 112B, 112C and 112D that have been established for each of the exemplary Certificates 106A, 106B, 106C and 106D. It is of course understood and appreciated that the nature of the History 112 may be dependent upon the designer's preference and therefore may vary from one embodiment to the next. Indeed the History 112 may be a relational database, or as shown in FIG. 2 for ease of illustration and description a table 200.

As shown, table 200 presents a series of entries, specifically one for each User 102 known to the HDC 100 system. For the exemplary History 112 presented in table 200, the date 202, time 204, IP address 206 and Device Criteria 208 for each system the User 102 who has been provided a Certificate 106 for authorized access is noted in each record. The most recent history 112 of a request by each user 102 is shown in left column 210. For at least one embodiment the Device Criteria 208, if specified, is evaluated to the device trait 140 (see FIG. 1).

In at least one embodiment the first device 104 has Device Trait 140 corresponding to at least one predefined Device Criteria 208. In varying embodiments and as noted above in the definitions, the Device Trait 140 is understood and appreciated to be a physical aspect of the device and/or a software aspect of the device. More specifically, the Device Trait 140 is an identifiable element of the device, such as, but not limited to, device ID number, device serial number, device type, manufacturer, software version, software ID, an application, digital ID, MAC address, or other similar element that may be used to identify a class of devices, if not uniquely identify one device from another. Moreover, in at least one embodiment the Device Trait 140 is intended to be unique to each device, such as a device ID number or serial number. For yet another embodiment, the Device Trait 140 is not specifically unique to only one device, but rather serves to identify a class or type of device, i.e., an iPad® 2, an iPad® 3, or an iPhone® 5. In addition, in general the at least one Device Trait 140 is also something that is not easily duplicated from one device to another.

Briefly stated, the History 112 permits validation of a Certificate 106 to be based on a variety of additional factors aside from just a traditional indication of validity or invalidity based on presence or absence in a CRL, and a review of the Certificate 106 itself. Moreover, the Validation System 110 evaluates the at least one Characteristic 118 associated with a request 116 against the History 112 for the particular Certificate 106 provided with the request.

Moreover, it is understood and appreciated that the Authentication System 108 is for at least one embodiment structured and arranged to interpret a Certificate 106 for a basic evaluation of validity—i.e. a review of the embedded serial number, the person or entity it is assigned to, the issuer, the valid from date, the valid to date, and other data inherent to the Certificate 106 itself. However, the purpose and advantage of HDC 100 is to permit greater degree of control and assessment of validity based on the at least one Characteristic 118 that is associate with, but distinct from the Certificate 106 as this Characteristic 106 is evaluated against the History 112 for the Certificate 106.

For at least one alternative embodiment, the mere possession of a Certificate 106 and ability to provide it with a request 106 is considered sufficient to engage the Validation System 110 for the evaluation of the Characteristic 118 based on the History 112.

In at least one embodiment, the evaluation of the Characteristic 118 against the History 112 is a verification that the User 102 is attempting access within a regular use window, such as at least once every week, once every month, or some other period of days. In at least one alternative embodiment, the evaluation of the Characteristic 118 against the History 112 is a verification that the User 102 is attempting access within an approved time window, such as normal business hours of 8:00 AM to 6:00 PM.

It should be understood and appreciated that as used herein, a regular use window is understood and appreciated to be distinct from an approved time window—the former applying to a general span of days with the latter referring to a specific period of time within each day. For the exemplary embodiment presented herein, the regular use window is to be at least once every 30 days, and the approved time window is 5:00 AM to 9:00 PM, Mountain Time (adjusted for Daylight savings when appropriate).

With respect to FIG. 2 and the History 112 of use shown for User 102A, it is clear that User 102A has been compliant with the regular use window and the approved time window as the log shows daily access within the approved time. Further, the table 200 notes that User 102A appears to alternate locations, gaining access from within a first network such as company network (10.20.30.x) and gaining access from apparently a remote location, such as home (67.41.129.137). The table 200 also reflects that User 102A is to use a first device 104A having a device trait 140 corresponding to the Device Criteria 208 of "TR1," which for the sake of example is understood and appreciated to be a laptop assigned to User 102A.

For at least one embodiment, the Validation System 110 is additionally configured such that the evaluation of the Characteristic 118 against the History 112 also includes a verification that the User 102 is attempting access with an authorized first device 104, as may be determined by the device trait 140. Further still, the evaluation of the Characteristic 118 against the History may include a verification of origin IP address from which the request is being made, i.e., does the origin IP address of the current request match a previous origin IP address and or a range of approved IP addresses? And yet further, the evaluation of the Characteristic 118 against the History may include a verification that the User is not attempting access at a frequency that is above or below a threshold—in other words is the User attempting too many or too few access requests within a given time period.

Moreover, the Validation System 110 in varying embodiments, and even for varying Users may be structured and arranged to evaluate at least one Characteristic 118 against a History of use for the specified Certificate 106 including one or more elements of access within a regular use window, access within an approved time window, access with an authorized system, access from an approved IP address, and access at a frequency that is within a defined threshold. Of course this list is provided by way of example and not limitation as other elements of Certificate 106 History 112 may of course be used as desired in varying embodiments.

In response to a positive evaluation by the Validation System 110 validating the Certificate 106 the Authentication System 108 permits access to the User 102. In response to a negative evaluation by the Validation System 110 the Authentication System 108 blocks access to the User 102 and restricts the Certificate 106. For at least one embodiment of HDC 100, restriction of the Certificate 106 is revocation of the Certificate 106. For at least one alternative embodiment of HDC 100, restriction of the Certificate 106 initiates an opportunity for the User 102 to re-authenticate him or herself before the Certificate is revoked.

For at least one embodiment of HDC 100 structured and arranged to present the option for re-authorization, the re-authorization process may be a multi part test and where the User is provided information that must be returned to of HDC 100, or a system or device in communication with HDC 100, or the User 102 directed to provide specific information that he or she has previously established.

Moreover, the re-authorization process may be selected from consisting of, but not limited to, an SMS code for the User 102 for entry upon a specific website within a specific time window, an SMS message to the User 102 requiring a specific reply from the User 102 within a specific time window, an email with a code for entry upon a specific website, an email to the User 102 that requires a specific reply within a specific time window, a redirection directly, by SMS or by email to a website which requires the User 102 to complete one or more captcha, and redirection of the User to a website which requires entry of additional User information.

With respect to FIG. 1, re-authentication is achieved in at least one embodiment by directing the User to third system 142, which may be the same system to which new Users are directed for the initial process of obtaining a Certificate 106. For at least one embodiment, the third system as the initial system is structured and arranged with specific details regarding each User 102, such as but not limited to social security number, address, birth date, credit card number, personal challenge questions, and/or such other information as may be appropriate for establishing the credentials of a User and providing a Certificate 106. This third system 142 is therefore structured and arranged to challenge a User 102 to re-authenticate him or herself so as to un-restrict his or her Certificate 106.

With respect to the details that may be recorded in the History 112, it should be understood and appreciated that the evaluating the Characteristic 118 provides near real time adjustment to the apparent validity of the Certificate 106 without the use of a Certificate Revocation List. Moreover, it is understood and appreciated that the Authentication System 108 is for at least one embodiment structured and arranged to interpret a Certificate 106 for a basic evaluation of validity—i.e. a review of the embedded serial number, the person or entity it is assigned to, the issuer, the valid from date, the valid to date, and other data inherent to the Certificate 106 itself. However, the purpose and advantage of HDC 100 is to permit greater degree of control and assessment of validity based on the at least one Characteristic 118 that is associate with, but distinct from the Certificate 106 as this Characteristic 106 is evaluated against the History 112 for the Certificate 106.

Moreover, the operation of HDC 100 may be further appreciated in briefly reviewing exemplary cases of Users 102 attempts to gain access, such as access to the Second System 114, that are either successful or unsuccessful based on the evaluation of the Characteristic 118.

Having described embodiments for HDC 100 as shown with respect to FIGS. 1 and 2, other embodiments relating to varying methods of managing network access based on a History 112 of a Certificate 106 will now be discussed with respect to FIG. 3, in connection with FIGS. 2 and 4-9. More specifically, FIGS. 6, 7, 8 and 9 are variations based on FIG. 1 each separately illustrating a request 116 for access by users 102A-102D and the resulting process leading to approval or denial. It will be appreciated that the described method need not be performed in the order in which it is herein described, but that this description is merely exemplary of one method of managing network access based on a History 112 of a Certificate 106.

In general, method 300 commences with a Certificates 106 being generated, block 302. A specific User may or may not yet be known, as it is in some cases desired to have a plurality of Certificates 106 ready for assignment to Users. For at least one embodiment, the History 112 of each Certificates 106 is optionally established about contemporaneously with the Certificate being issued, optional block 304. Moreover, the History 112 may be established concurrently with the generation of the Certificate 106 or shortly thereafter when HDC 100 is informed that the Certificate 106 has been generated.

This is the case with User 102A, Teah, who's Certificate 106A is AABB and which was generated on Sep. 19, 2006 and at that time the History 112 for this Certificate 106A was established. The regular use window for User 102A is also specified to be thirty days, indicating that User 102A must make an access request at least once every thirty days.

Of course, Certificates 106 may also be generated at or about the time they are to be issued to a User. This is the exemplary case with Users 102B, 102C and 102D.

The generated Certificates 106 are each provided in turn to each exemplary User 102A, 102B, 102C and 102D, block 306. Of course these Certificates 106 need not be issued to Users at the same time, and may of course be issued as each User 102 is added. If the History 112 was not established when the Certificate 106 was issued, then for at least one embodiment, the History of the Certificates 106 may be optionally established about contemporaneously with the Certificate being provided to the User 102, optional block 308.

This is the case with User 102B, Bill, who's Certificate 106B is BBCC and which was issued to User 102B on Apr. 3, 2010. The regular use window for User 102B is also specified to be forty-five days, indicating that User 102B must make an access request at least once every forty-five days. And there is a notation that User 102B is on vacation from Apr. 15, 2013- May 5, 2013.

This is also the case for User 102C, Jim, who's Certificate 106C is DDEE and which was issued to User 102C on Jan. 2, 2013. The regular use window for User 102C is also specified to be seven days, indicating that User 102C must make an access request at least once every seven days. User 102C also has a specified approved time window of 8 AM-6 PM, Monday-Friday.

In the case of User 102D, Tom, who's Certificate 106D is EEFF, the History 112 is established when User 102D made his first access request on Oct. 4, 2011. The regular use window for User 102D is also specified to be twenty days, indicating that User 102D must make an access request at least once every 20 days. User 102D also has a specified threshold of four access requests per day.

For the sake of the present example, the History 112 shown in table 200 has been populated with historic records of access requests for each User 102A, 102B, 102C and 102D.

Possessing a Certificate 106, the Users 102 of HDC 100 are set to request access and receive access, or so each may believe. HDC 100 now receives a request for network access from the User 102, the request providing the Certificate 106 and providing, or otherwise triggering an associated Characteristic 118, block 310.

If the History 112 has not yet been established (such as by not engaging an optional History creation point noted above), the first instance of a request for access triggers the creation of the History 112 for the User's Certificate 106, decision 312 and block 314. Moreover, whether at time of generation, time of issuing to a User 102, or time of first access attempt, method 300 insures that a History 112 for the Certificate 106 is established, and as conceptually illustrated the History 112 can be different in how it is established for different Users 102 and different Certificates 106.

The Characteristic 118 is then evaluated, block 316. Moreover, method 300 evaluates the Characteristic 118 against the History 112—is the access being requested within the specified regular use window, is the access being requested within the specified approved time window, is the access being requested with a proper system, etc. . . . ?

This evaluation is valued either as a positive or a negative, decision 318. In the case of a positive evaluation, the Certificate 106 is deemed validated, block 320. The corresponding History 112 is updated to reflect the most recent access request, block 322, and the User is granted access to the Second System 114, block 324.

Figure 6:
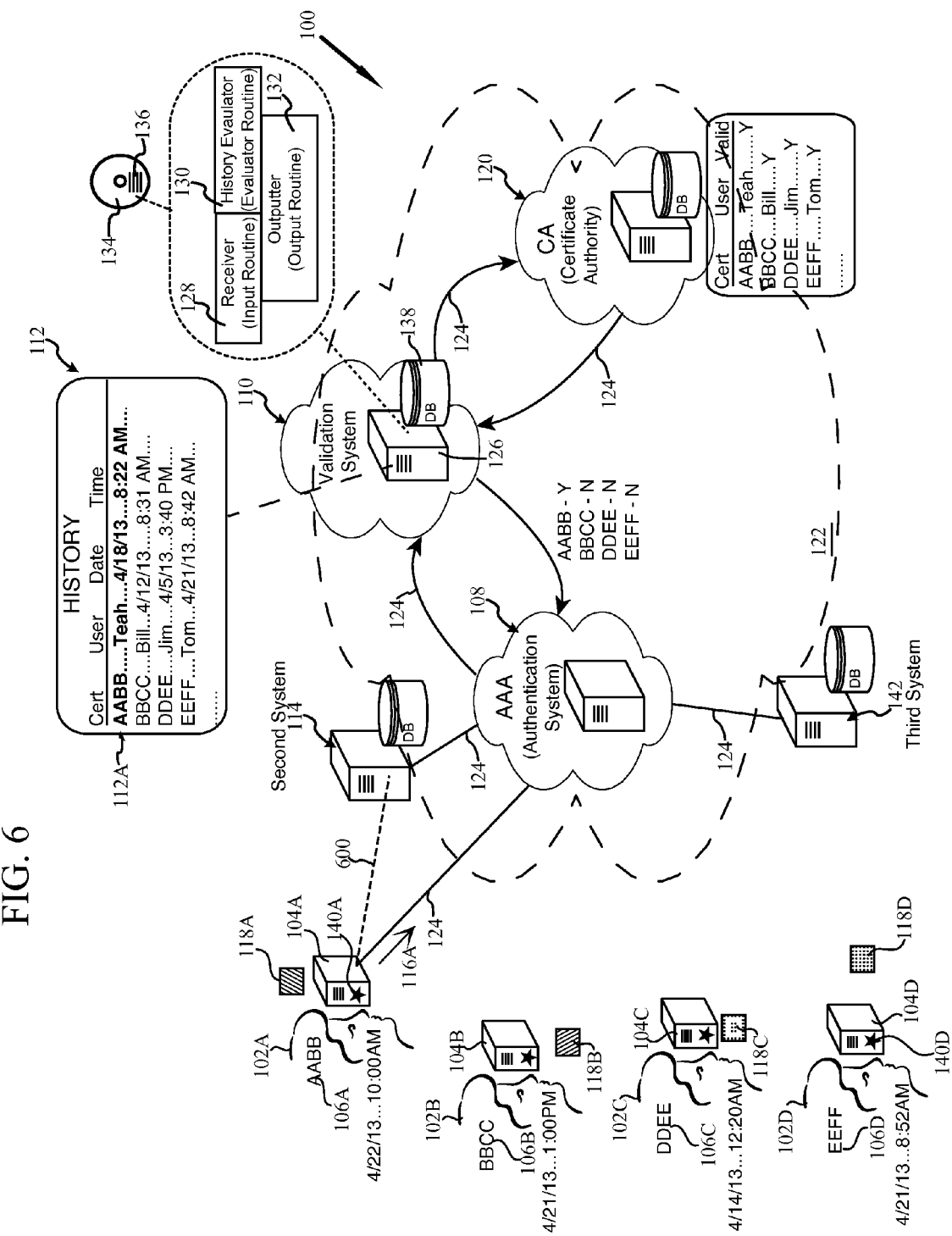
FIG. 6 is a refined version of FIG. 1 further illustrating the managed access based on a history of a certificate for a request by a first user in accordance with at least one embodiment.

In the exemplary case of User 102A, Teah, as shown in FIG. 6, the exemplary access request 116A is being made on Apr. 22, 2023 at 10:00 AM. Moreover at least one Characteristic 118A of her request 116A is the date and time of the request. Additionally her origin IP address and even a Device Trait 140A may be provided with the request 116A as additional Characteristics.

Figure 4:
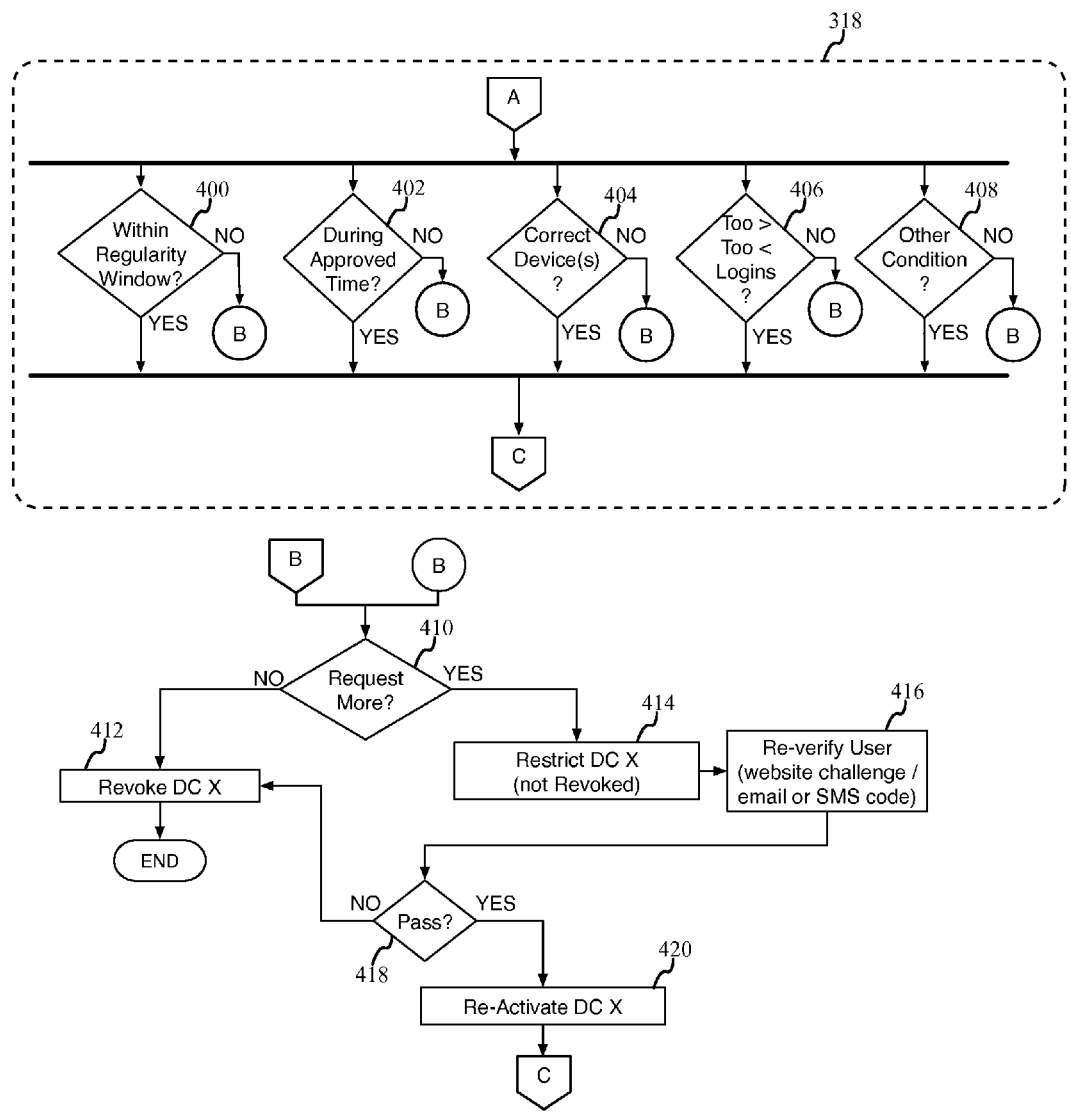
FIG. 4 illustrates an enhanced portion of a flow diagram to demonstrate options for evaluation of the history in accordance with at least one embodiment.

As indicated by off page references "A" and "C" in connection with decision 318 in FIG. 3, the options for evaluation are further conceptualized in FIG. 4. Moreover, in varying embodiments method 300 can provide multiple options for evaluation—such as but not limited to: evaluation of the request within a regular window of use, decision 400, evaluation of the request during an approved time window, decision 402, evaluation of the request being made with a correct device, decision 404, evaluation of the request being above or below a threshold, decision 406, or evaluation of another condition, such as origin IP address, decision 408. These varying options for evaluation may be performed sequentially of as conceptually illustrated, generally contemporaneously.

For the exemplary case of User 102A, the request 116 is positively evaluated as occurring during the regular use window, decision 400, during an approved time window 402, with an approved device, decision 404, and from an approved IP address (other condition—decision 408). Accordingly, User 102A has valid authentication, block 320. The History 112A of Certificate 106A for User 102A is updated as shown in FIG. 5 to reflect details of the most recent request in column 500, specifically request 116A, block 322, and User 102A is granted access 600 to the Second System 114, block 324. Moreover, the history 112 as shown in FIG. 2 has been shifted to the right, such that column 210 is no longer a reflection of the most recent history 112. The details shown in column 500 for the additional users 102B, 102C and 102D is discussed below.

Figure 7:
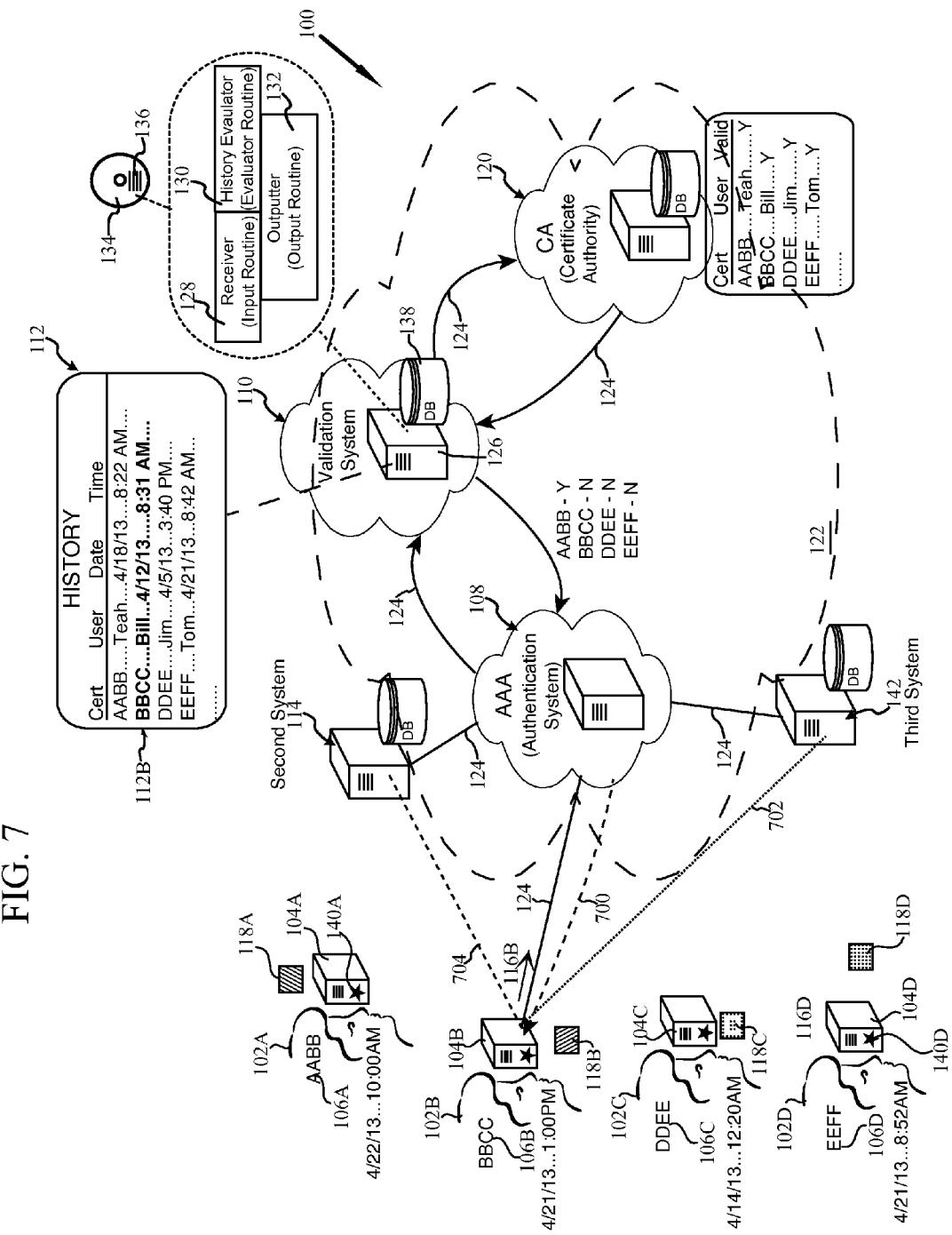
FIG. 7 is a refined version of FIG. 1 further illustrating the managed access based on a history of a certificate for a request by a second user in accordance with at least one embodiment.

In the exemplary case of User 102B, Bill, as shown in FIG. 7 and the detailed history 112B of FIG. 5, he is expected to be on vacation from Apr. 15, 2013-May 5, 2013. His last request was made on Apr. 12, 2013 at 8:31 AM. As shown in FIG. 7, there is an exemplary access request 116B is being made on Apr. 21, 2013 at 1:00 PM. Moreover at least one Characteristic 118 of his request 116B is the date and time of the request. Additionally, his origin IP (199.181.132.250) address for the request is received as an additional Characteristic 118.

In the case of User 102B, although the request 116B is received within the regular use window, decision 400, the request is being received while he is on vacation, and therefore not within a currently adjusted approved time window, decision 402.

For at least one embodiment, such unexpected use can by itself trigger, the revocation of Certificate 106B, decision 410 and block 412. However, for at least one embodiment, method 300 permits an opportunity for re-authentication before revocation of Certificate 106B is performed, decision 410.

In other words, HDC 100 de-activates Certificate 106B—which is to say that it has not been revoked and its status with the Certificate Authority 120 is unchanged. But within HDC 100 the Certificate 106B is in a state of suspension, block 414.

As User 102B is believed to be on vacation, the origin IP address of the request 116B may optionally be reviewed to confirm User 102B being proximate to his designated place of vacation. Of course for optional embodiments, no review of the origin IP address of the request 116B need be made.

HDC 100 now directs a text message 700, more commonly referred to as an SMS, to User 102B with a code, such as 28088, which User 102B must enter on Third System 142 to restore his Certificate 106B and proceed obtaining the requested access. For this hypothetical example, it is assumed that User 102B is responding to a request from a co-worker or client and therefore although on vacation has a legitimate basis for his access request. Receiving the SMS code, User 102B accesses Third System 142 via communication link 702, such as by a web browser, within a time window and provides the received code, i.e. code 28088, block 416.

HDC 100 and more specifically method 300 receives acknowledgement from Third System 142 that User 102B has been re-authenticated, decision 418. Certificate 116B is then re-activated, block 420. The History 112B of Certificate 106B for User 102B is updated as shown in FIG. 5 to reflect details of the most recent request 116B, block 322, and User 102B is granted access 704 to the Second System 114, block 324.

Figure 8:
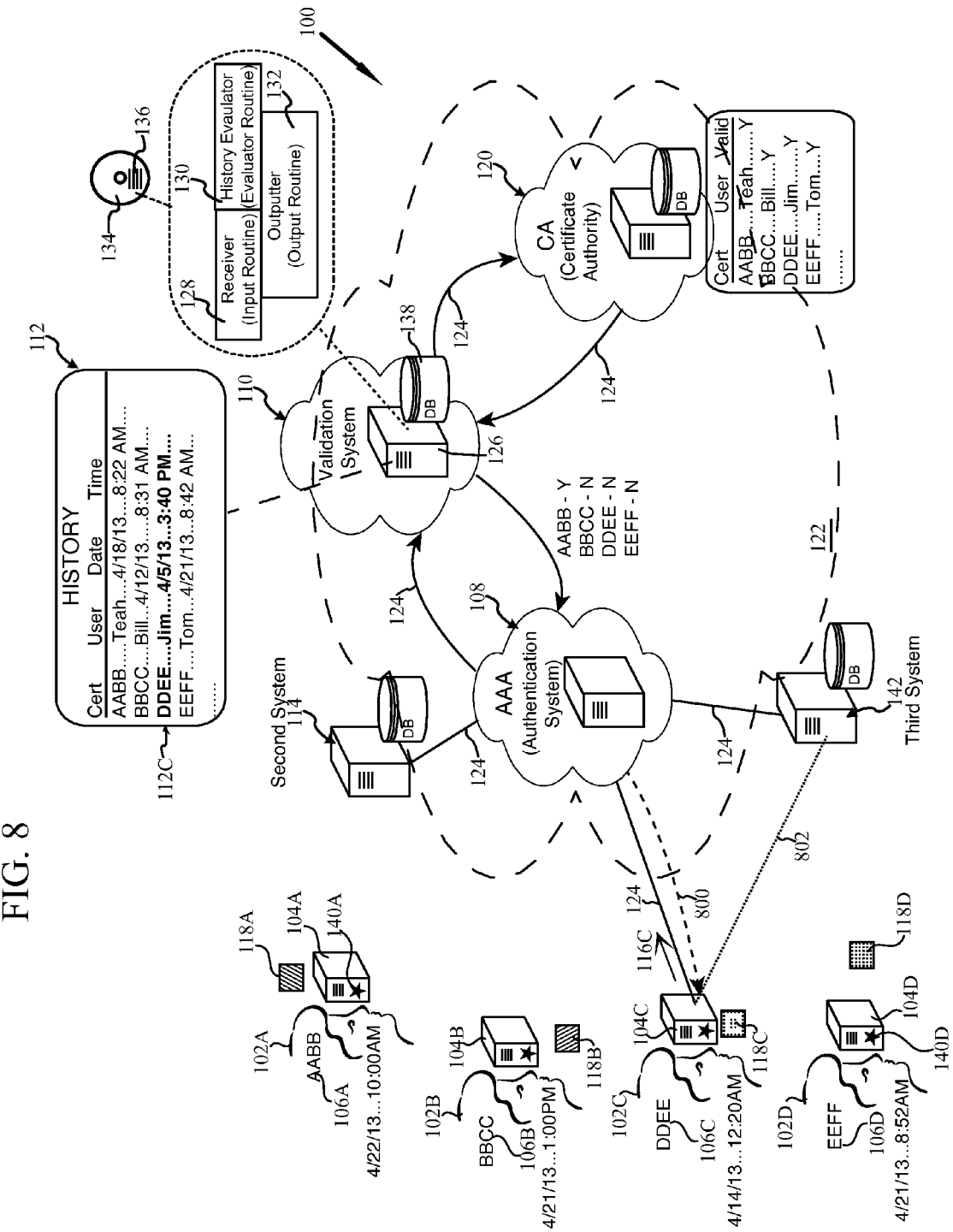
FIG. 8 is a refined version of FIG. 1 further illustrating the managed access based on a history of a certificate for a request by a third user in accordance with at least one embodiment.

In the exemplary case of User 102C shown in FIG. 8, as indicated in the History 112C, his regular use window is seven days, and his last access is noted to have been on Apr. 5, 2013 at 4:30 PM. As shown in FIG. 8, there is an exemplary access request 116C being made on Apr. 14, 2013 at 12:20 AM. Not only is this request 116C being made outside of the regular use window of seven days, the request is also being made on a Sunday outside of the approved time window, decisions 400 and 402.

As with User 102B, User 102C may be given an opportunity to re-authenticate himself, decision 410. Certificate 116C is deactivated, block 414. In this case, rather than an SMS, the Authentication System directly provides User 102D with a hyper link 800 that redirects User 102D to Third System 142 by communication link 802 where User 102C is requested to confirm the last four numbers of his credit card on file and the name of his first pet. As apparent User 102C cannot provide either the numbers of the credit card or the name of his first pet, Certificate 116C is revoked, block 412. The History 112C of Certificate 106C for User 102C may be optionally updated as shown in FIG. 5 to reflect that it has been revoked.

In the exemplary case of User 102D, as indicated in the History 112D, his regular use window is every 20 days and the historical Device Criteria 208D is DR2 corresponding to a Device Criteria 108D—a company issued system. There is also a notation that User 102D is permitted four access requests per day.

Figure 9:
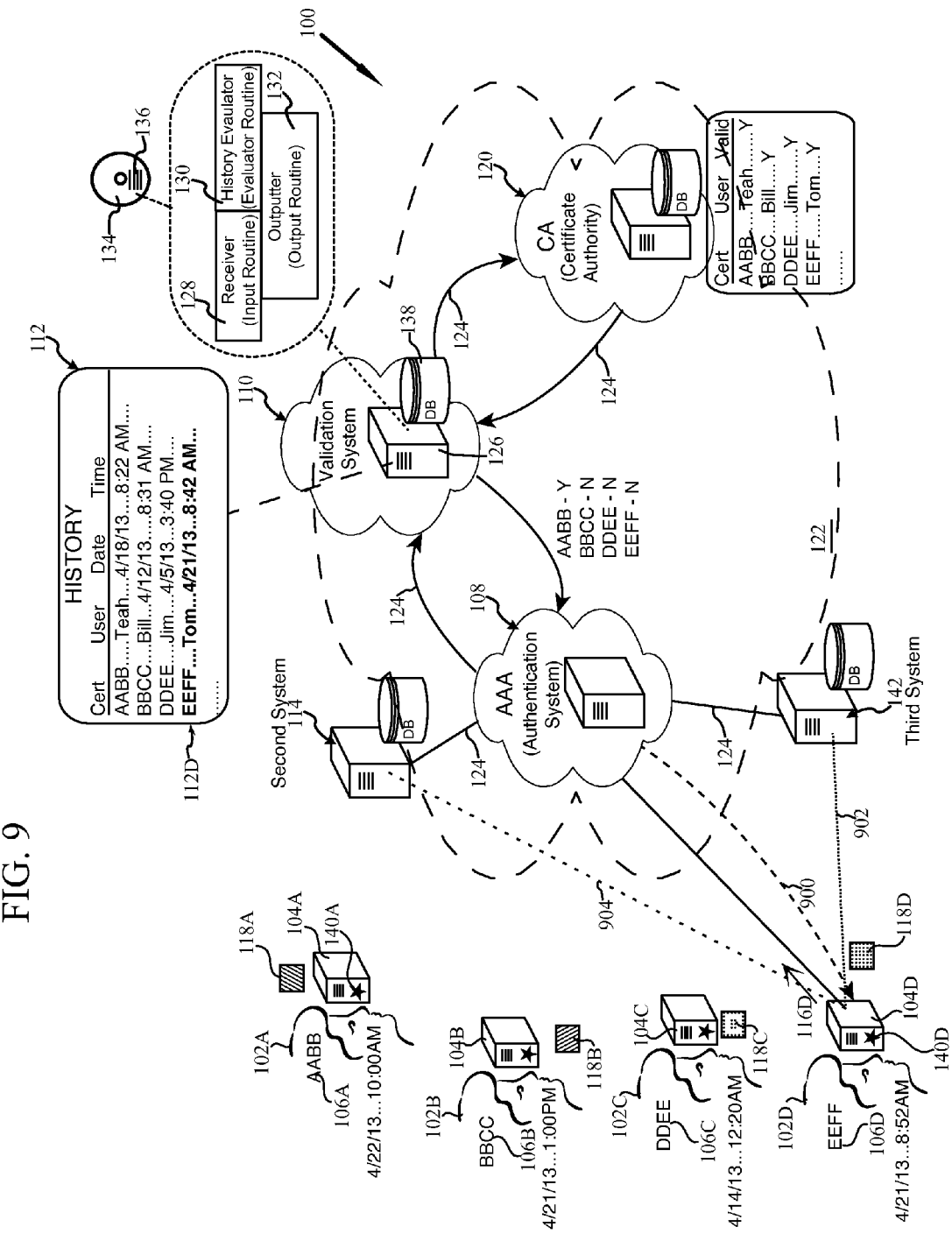
FIG. 9 is a refined version of FIG. 1 further illustrating the managed access based on a history of a certificate for a request by a fourth user in accordance with at least one embodiment.

As shown in FIG. 9 for the exemplary case of User 102D the request 116D is being made on Apr. 21, 2013 at 8:52 AM. Moreover a Characteristic 116D of this request 116D is the date and time, which when compared to the History 112D is evaluated to be over the threshold of four access requests per day, decision 406.

As with Users 106B and 106C, User 102D may be given an opportunity to re-authenticate himself, decision 410. Certificate 116D is deactivated, block 414, and User 102D is sent an email 900 with a specific html link that directs him to Third System 142 via communication link 902 where he is presented with a captcha—a visual or audio challenge that is intended to be human only recognizable. For example, User 102D is presented with a highly distorted set of characters that he must type into a website to verify that he is a person, block 416. Following this success, he may also be also asked the name of his first pet.

Having successfully passed the re-authentication challenge, decision 418, Certificate 106D is re-activated, block 420. Accordingly, HDC 100 recognizes User 102D as having valid authentication, block 320 and the History 112D for User 102D is updated as shown in FIG. 5, block 322, and User 102D is granted access 904 to the Second System 114.

Moreover, embodiments of HDC 100 and method 300 permit advantageous control of Certificates 116 and how they are used. An authorized User 102 may certainly receive a Certificate for access that is viable for his or her company system (e.g., the Users First Device 104), but in varying embodiments he or she may not transfer this Certificate to his or personal computer, tablet, phone or other non-company system. For administrative ease the life span of the issued Certificate may also be quite great—measured in multiple years for example, yet the granularity of a regular use window and approved time window, as well as other Characteristics permit advantageous control of access and perceived validity of one or more Certificates 106 without reliance upon a traditional CRL.

To summarize, for at least one embodiment, method 300 commences with receiving a request 116 for network access from a User 102, the request providing a Certificate 106 and having at least one Characteristic 118 distinct from the digital Certificate 106. The method 300 operates to evaluate the at least one Characteristic 118 against a History 112 for the Certificate 106 to provide a positive or negative evaluation. In response to a positive evaluation, the method validates the Certificate 106 and permits network access to the User 102. In response to a negative evaluation, the method 300 restricts the Certificate 106 and blocks network access to the User 102. The History 112 is correspondingly updated to include the most recent request. Optionally, in the event of a negative evaluation, the User 102 may be presented with an opportunity to re-authenticate before the Certificate 106 is revoked.

Figure 10:
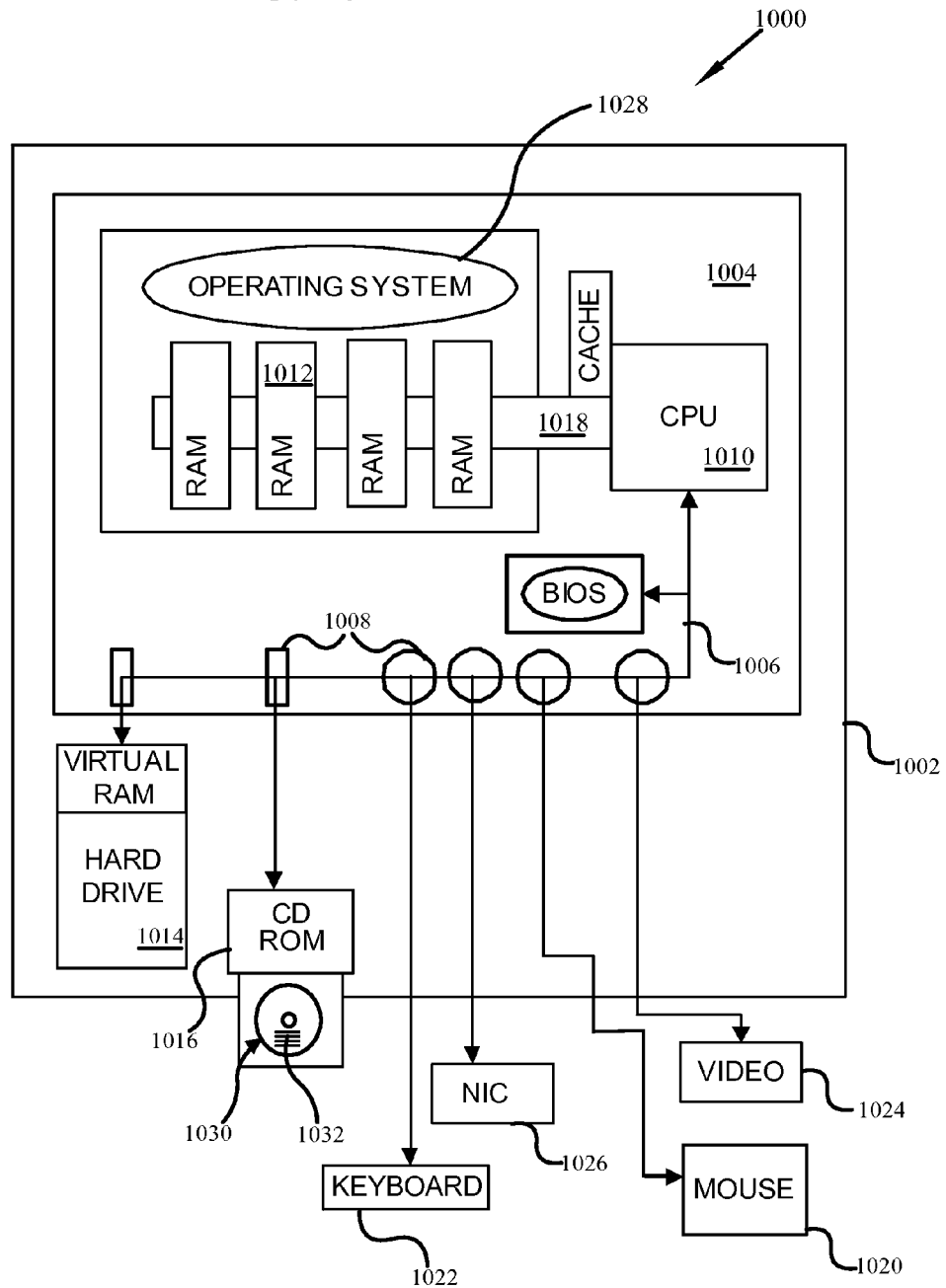
FIG. 10 is a high level block diagram of a computer system in accordance with at least one embodiment.

With respect to the above description of the system and method for providing a Certificate 160, it is understood and appreciated that the method may be rendered in a variety of different forms of code and instruction as may be used for different computer systems and environments. To expand upon the initial suggestion of the First Device 104, Authentication System 108, Validation System 110, Second System 114, Certificate Authority 120, and Third System 142 being computer systems adapted to their specific roles, FIG. 10 is a high level block diagram of an exemplary computer system 1000 such as may be provided for one or more of the elements comprising the First Device 104, Authentication System 108, Validation System 110, Second System 114, Certificate Authority 120, and Third System 142 whether provided as distinct individual systems or integrated together in one or more computer systems.

Computer system 1000 has a case 1002, enclosing a main board 1004. The main board 1004 has a system bus 1006, connection ports 1008, a processing unit, such as Central Processing Unit (CPU) 1010 with at least one macroprocessor (not shown) and a memory storage device, such as main memory 1012, hard drive 1014 and CD/DVD ROM drive 1016.

Memory bus 1018 couples main memory 1012 to the CPU 1010. A system bus 1006 couples the hard disc drive 1014, CD/DVD ROM drive 1016 and connection ports 1008 to the CPU 1010. Multiple input devices may be provided, such as, for example, a mouse 1020 and keyboard 1022. Multiple output devices may also be provided, such as, for example, a video monitor 1024 and a printer (not shown). As computer system 1000 is intended to be interconnected with other computer systems in the HDC 100 a combined input/output device such as at least one network interface card, or NIC 1026 is also provided.

Computer system 1000 may be a commercially available system, such as a desktop workstation unit provided by IBM, Dell Computers, Gateway, Apple, or other computer system provider. Computer system 1000 may also be a networked computer system, wherein memory storage components such as hard drive 1014, additional CPUs 1010 and output devices such as printers are provided by physically separate computer systems commonly connected together in the network. Those skilled in the art will understand and appreciate that the physical composition of components and component interconnections are comprised by the computer system 1000, and select a computer system 1000 suitable for one or more of the computer systems incorporated in the formation and operation of HDC 100.

When computer system 1000 is activated, preferably an operating system 1028 will load into main memory 1012 as part of the boot strap startup sequence and ready the computer system 1000 for operation. At the simplest level, and in the most general sense, the tasks of an operating system fall into specific categories, such as, process management, device management (including application and User interface management) and memory management, for example. The form of the computer-readable medium 1030 and language of the program 1032 are understood to be appropriate for and functionally cooperate with the computer system 1000.

Moreover, variations of computer system 1000 may be adapted to provide the physical elements of one or more components comprising each First Device 104, Authentication System 108, Validation System 110, Second System 114, Certificate Authority 120, and Third System 142 the switches, routers and such other components as may be desired and appropriate for the methods and systems of managing network access based on a History of a Certificate 106.

Changes may be made in the above methods, systems and structures without departing from the scope hereof. It should thus be noted that the matter contained in the above description and/or shown in the accompanying drawings should be interpreted as illustrative and not in a limiting sense. Indeed many other embodiments are feasible and possible, as will be evident to one of ordinary skill in the art. The claims that follow are not limited by or to the embodiments discussed herein, but are limited solely by their terms and the Doctrine of Equivalents.

What is claimed:

1. A method of managing network access based on a history of use for a Certificate comprising:
    establishing the history of use for the certificate for managing the network access when the certificate is generated;
    providing the certificate to the user;
    receiving, by an authentication device, a request for network access from the user by way of a first device having at least one processor, the request providing the Certificate and having at least one Characteristic for validation of the Certificate and distinct from the Certificate;
    insuring that the history of use for the certificate is established; if the history of use of Certificate has not been established, establishing the history of use for the certificate before evaluating the at least characteristic against the history of use for the certificate;
    evaluating the at least one Characteristic by comparing the at least one characteristic with the history of use for the Certificate to provide a positive or negative evaluation of the request;
        in response to a positive evaluation of the at least one characteristic in the Request, validating the Certificate provided in the request and permitting certificate based network access to the user's first device;
        in response to a negative evaluation of the at least one characteristic in the request, restricting the Certificate provided with the request and blocking network access to the user's first device; and
    updating the history of use for the Certificate to include the request.

2. The method of claim 1, wherein evaluating the at least one Characteristic provides near real time adjustment to the apparent validity of the Certificate without the use of a Certificate Revocation List as provided by a Certificate authority.

3. The method of claim 1, further including establishing the history of use for the Certificate when the Certificate is provided to the user for use with the first device.

4. The method of claim 1, further including establishing the history of use for the Certificate when the Certificate is generated.

5. The method of claim 1, further including establishing the history of use for the Certificate when the Certificate is provided with the request.

6. The method of claim 1, wherein restricting the Certificate is revoking the Certificate.

7. The method of claim 1, wherein restricting the Certificate initiates an opportunity for the user to re-authenticate him or herself before revoking the Certificate.

8. The method of claim 7, wherein the opportunity for re-authentication is selected from the group consisting of: a Short Message Service ("SMS") code to the user for entry upon a website, an SMS message which requires a specific SMS reply, an email with verification link, an email with a code for entry upon a website, an email that requires a reply, redirection to a website which requires completion of a captcha, and redirection to a website which requires entry of additional information.

9. The method of claim 1, wherein evaluating the at least one Characteristic against the history of use is a verification that the user is attempting access with the first device within a regular use window.

10. The method of claim 1, wherein evaluating the at least one Characteristic against the history of use is a verification that the user is attempting access with the first device within an approved time window.

11. The method of claim 1, wherein evaluating the at least one Characteristic against the history of use is a verification that the user is attempting access with an authorized computing system having at least one processor.

12. The method of claim 1, wherein evaluating the at least one Characteristic against the history of use is a verification that the user is not attempting access at a frequency above or below a threshold.

13. The method of claim 1, wherein the method is provided on a non-transitory machine readable medium as a computer program comprising instructions which when executed by a computer system having at least one processor performs the steps of providing a Certificate for network access.

14. A system for managing certificate based network access based on a history of use of a Certificate provided to a user comprising:
    an authentication hardware system structured and arranged to receive from a User by way of a first device having at least one processor, a request for certificate based network access, the request including the Certificate and at least one associated Characteristic for validation of the Certificate and distinct from the Certificate; and
    a validation hardware system having at least one processor and being in communication with the authentication hardware system and structured and arranged to receive a request for validation of the Certificate, the validation system
    insuring that the history of use for the certificate is established; if the history of use of Certificate has not been established, establishing the history of use for the certificate before evaluating the at least characteristic against the history of use for the certificate; and evaluating the at least one Characteristic by comparing the at least one characteristic with the history of use for the Certificate to provide a positive or negative evaluation of the request, the validation system further updating the history of use for the Certificate to include the request for validation of the Certificate;

wherein in response to a positive evaluation of the at least one characteristic in the Request validating the Certificate provided in the request, the authentication hardware or software system permitting certificate based network access to the user's first device and in response to a negative evaluation of the at least one characteristic in the Request the authentication system blocking network access to the user's first device and the Certificate provided with the request being restricted.

15. The system of claim 14, wherein the validation system is a component of the authentication system.

16. The system of claim 14, wherein the validation system is a component of a Certificate authority responsible for the Certificate.

17. The system of claim 14, wherein the validation system is a disposed between the authentication system and a Certificate authority responsible for the Certificate.

18. The system of claim 14, wherein the history of use for the Certificate is established when the Certificate is provided to a user.

19. The system of claim 14, wherein the history of use for the Certificate is established when the Certificate is generated.

20. The system of claim 14, wherein the history of use for the Certificate is established when the Certificate is provided with the request.

21. The system of claim 14, wherein restricting the Certificate is revoking the Certificate.

22. The system of claim 14, wherein restricting the Certificate initiates an opportunity for the user to re-authenticate him or herself before revoking the Certificate.

23. The system of claim 22, wherein the opportunity for re-authentication is selected from the group consisting of: a Short Message Service ("SMS") code to the user for entry upon a website, an SMS message which requires a specific SMS reply, an email with verification link, an email with a code for entry upon a website, an email that requires a reply, redirection to a website which requires completion of a captcha, and redirection to a website which requires entry of additional information.

24. The system of claim 14, wherein evaluating the at least one Characteristic against the history of use is selected from the group consisting of: a verification that the user is attempting access within a regular use window, a verification that the user is attempting access within an approved time window, a verification that the user is attempting access with an authorized system, a verification that the user is not attempting access at a frequency above or below a threshold.

25. The system of claim 14, wherein evaluating the at least one Characteristic provides near real time adjustment to the apparent validity of the Certificate without the use of a Certificate Revocation List as provided by a Certificate authority.

26. A non-transitory machine readable medium on which is stored a computer program for managing certificate based network access based on a history of use for a Certificate provided to a user, the computer program comprising instructions which when executed by a computer system having at least one processor performs the steps of:

establishing the history of use for the certificate for managing the network access when the certificate is generated;

receiving, by an authentication device, a request for network access from the user by way of a first device having at least one processor, the request providing the Certificate and having at least one Characteristic for validation of the Certificate and distinct from the Certificate;

insuring that the history of use for the certificate is established; if the history of use of Certificate has not been established, establishing the history of use for the certificate before evaluating the at least characteristic against the history of use for the certificate;

evaluating the at least one Characteristic by comparing the at least one characteristic with the history of use for the Certificate to provide a positive or negative evaluation of the request;

in response to a positive evaluation of the at least one characteristic in the Request, validating the Certificate provided in the request and permitting certificate based network access to the user's first device;

in response to a negative evaluation of the at least one characteristic in the request, restricting the Certificate provided with the request and blocking network access to the user's first device; and updating the history of use for the Certificate to include the request.

27. The non-transitory machine readable medium of claim 26, wherein evaluating the at least one Characteristic provides near real time adjustment to the apparent validity of the Certificate without the use of a Certificate Revocation List as provided by a Certificate authority.

28. The non-transitory machine readable medium of claim 26, further including establishing the history of use for the Certificate when the Certificate is provided to the user.

29. The non-transitory machine readable medium of claim 26, further including establishing the history of use for the Certificate when the Certificate is generated.

30. The non-transitory machine readable medium of claim 26, further including establishing the history of use for the Certificate when the Certificate is provided with the request.

31. The non-transitory machine readable medium of claim 26, wherein restricting the Certificate is revoking the Certificate.

32. The non-transitory machine readable medium of claim 26, wherein restricting the Certificate initiates an opportunity for the user to re-authenticate him or herself before revoking the Certificate.

33. The non-transitory machine readable medium of claim 32, wherein the opportunity for re-authentication is selected from the group consisting of: a Short Message Service ("SMS") code to the user for entry upon a website, an SMS message which requires a specific SMS reply, an email with verification link, an email with a code for entry upon a website, an email that requires a reply, redirection to a website which requires completion of a captcha redirection to a website which requires entry of additional information.

34. The non-transitory machine readable medium of claim 26, wherein evaluating the at least one Characteristic against the history of use is a verification that the user is attempting access within a regular use window.

35. The non-transitory machine readable medium of claim 26, wherein evaluating the at least one Characteristic against the history is a verification that the user is attempting access within an approved time window.

36. The non-transitory machine readable medium of claim 26, wherein evaluating the at least one Characteristic against the history of use is a verification that the user is attempting access with an authorized system.

37. The non-transitory machine readable medium of claim 26, wherein evaluating the at least one Characteristic against the history of use is a verification that the user is not attempting access at a frequency above a threshold.

38. A non-transitory machine readable medium on which is stored a computer program comprising instructions to adapt a computer system having at least one processor to provide certificate based network access based on a history of use of a Certificate provided to a user comprising:
- an input routine operatively associated with an input device for receiving a request for certificate based network access from a user by way of a first device having at least one processor, the request providing the Certificate and having at least one associated Characteristic related to the request and distinct from the Certificate;
- an evaluating routine for insuring that the history of use for the certificate is established; if the history of use of Certificate has not been established, establishing the history of use for the certificate before evaluating the at least characteristic against the history of use for the certificate; and evaluating the at least one Characteristic by comparing the at least one characteristic with the history of use for the Certificate to provide a positive or negative evaluation of the request;
    - in response to a positive evaluation of the at least one characteristic in the Request, validating the Certificate provided in the request and permitting certificate based network access to the user's first device;
    - in response to a negative evaluation of the at least one characteristic in the request, restricting the Certificate provided with the request and blocking network access to the user's first device; and
- updating the history of use for the Certificate to include the request; and
- an output routine for returning at least validation or restriction of the Certificate as determined by the evaluating routine.

39. The non-transitory machine readable medium of claim 38, wherein evaluating the at least one Characteristic provides near real time adjustment to the apparent validity of the Certificate without the use of a Certificate Revocation List as provided by a Certificate authority.

40. The non-transitory machine readable medium of claim 38, wherein restricting the Certificate is revoking the Certificate.

41. The non-transitory machine readable medium of claim 38, wherein restricting the Certificate initiates an opportunity for the user to re-authenticate him or herself before revoking the Certificate.

42. The non-transitory machine readable medium of claim 41, wherein the opportunity for re-authentication is selected from the group consisting of: a Short Message Service ("SMS") code to the user for entry upon a website, an SMS message which requires a specific SMS reply, an email with verification link, an email with a code for entry upon a website, an email that requires a reply, redirection to a website which requires completion of a captcha redirection to a website which requires entry of additional information.

43. The non-transitory machine readable medium of claim 38, wherein evaluating the at least one Characteristic against the history of use is a verification that the user is attempting access within a regular use window.

44. The non-transitory machine readable medium of claim 38, wherein evaluating the at least one Characteristic against the history of use is a verification that the user is attempting access within an approved time window.

45. The non-transitory machine readable medium of claim 38, wherein evaluating the at least one Characteristic against the history of use is a verification that the user is attempting access with an authorized system.

46. The non-transitory machine readable medium of claim 38, wherein evaluating the at least one Characteristic against the history of use is a verification that the user is not attempting access at a frequency above or below a threshold.

* * * * *